(12) United States Patent  
Fujimoto et al.

(10) Patent No.: US 11,549,407 B2  
(45) Date of Patent: Jan. 10, 2023

(54) VALVE TIMING CONTROL UNIT

(71) Applicants: AISIN CORPORATION, Kariya (JP); MAZDA MOTOR CORPORATION, Hiroshima (JP)

(72) Inventors: Kenya Fujimoto, Kariya (JP); Yoshinari Tokunaga, Kariya (JP); Shigehiro Tanabe, Kariya (JP); Takano Nakai, Hiroshima (JP); Yoshiyuki Kamoyama, Hiroshima (JP); Hiroshi Takahashi, Hiroshima (JP); Toru Hirota, Hiroshima (JP)

(73) Assignees: AISIN CORPORATION, Kariya (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/715,408

(22) Filed: Apr. 7, 2022

(65) Prior Publication Data

US 2022/0325643 A1    Oct. 13, 2022

(30) Foreign Application Priority Data

Apr. 9, 2021 (JP) .............................. JP2021-066604

(51) Int. Cl.
*F02D 13/04* (2006.01)
*F01L 1/352* (2006.01)
(Continued)

(52) U.S. Cl.
CPC .......... *F01L 1/352* (2013.01); *F01L 1/34403* (2013.01); *F01L 1/46* (2013.01); *F01L 2250/02* (2013.01);
(Continued)

(58) Field of Classification Search
CPC ............... F01L 2800/00; F01L 2201/00; F01L 2820/032; F01L 2820/044; F01M 9/10; F02D 13/02
See application file for complete search history.

(56) References Cited

U.S. PATENT DOCUMENTS

2009/0216427 A1* 8/2009 Yamakawa ......... F02D 41/0002 123/90.15
2009/0217906 A1* 9/2009 Nishimoto .......... F02D 41/0065 123/90.15

(Continued)

FOREIGN PATENT DOCUMENTS

JP 2004332671 A 11/2004
JP 2008286120 A 11/2008
JP 2019157679 A 9/2019

*Primary Examiner* — John Kwon
(74) *Attorney, Agent, or Firm* — Buchanan Ingersoll & Rooney PC

(57) ABSTRACT

The valve timing control unit includes a valve timing control mechanism that includes a driving rotary body, a driven rotary body, an electric motor and a deceleration gear each for setting the relative rotational phase of the driving rotary body and the driven rotary body, and a phase sensor unit that detects the actual phase of the driving rotary body and the driven rotary body. The valve timing control unit includes a controller that controls the electric motor to reduce a phase difference between the actual phase and a target phase, and the controller includes a swing controller that swings the target phase in vicinity of the target phase when the target phase is maintained and the actual phase having a fluctuation amount is held in a holding region, in which the fluctuation amount is less than a preset value.

20 Claims, 7 Drawing Sheets

(51) Int. Cl.
   *F01L 1/344*   (2006.01)
   *F01L 1/46*    (2006.01)
(52) U.S. Cl.
   CPC ....... *F01L 2250/04* (2013.01); *F01L 2810/02* (2013.01); *F01L 2810/04* (2013.01); *F01L 2820/032* (2013.01)

(56) References Cited

U.S. PATENT DOCUMENTS

2015/0330313 A1* 11/2015 Ueda .................. F02D 13/0215
                                                     123/90.15
2019/0277168 A1   9/2019 Mukaide
2022/0003132 A1*  1/2022 Amano .................. F01L 13/00

* cited by examiner

Fig.1
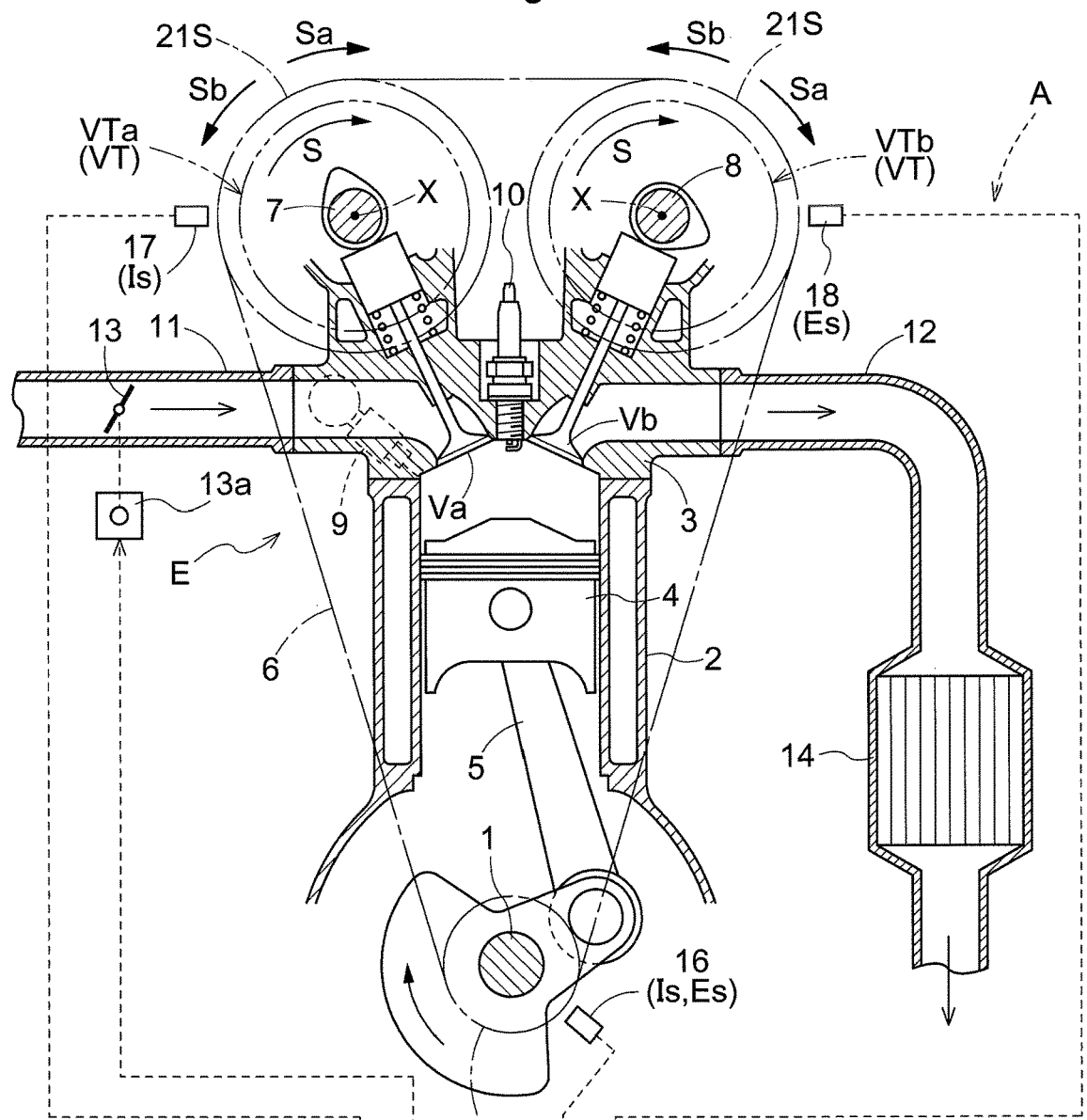
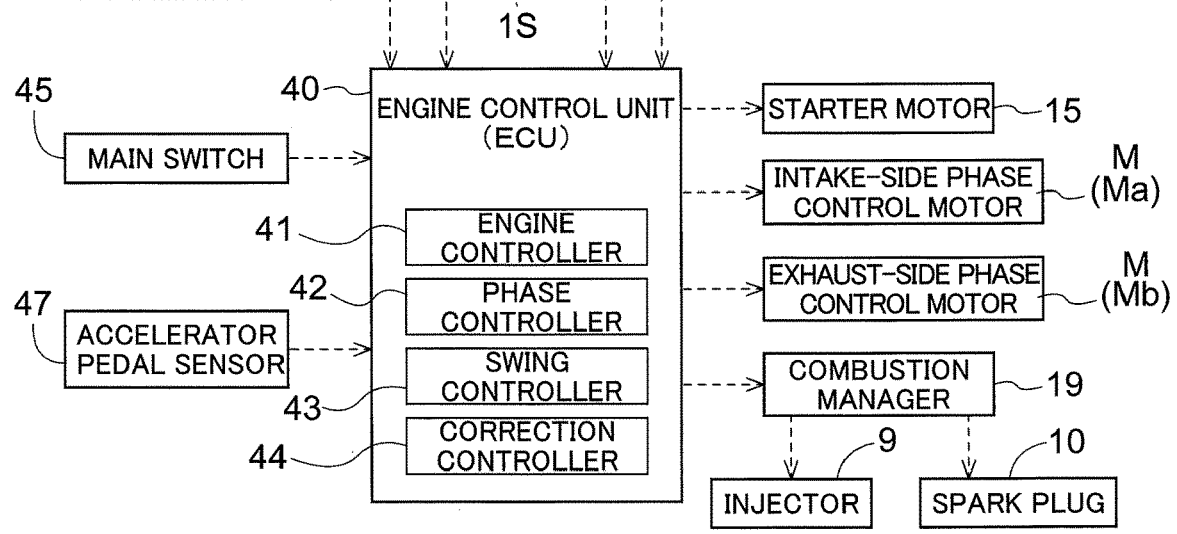

VALVE TIMING CONTROL UNIT

CROSS REFERENCE TO RELATED APPLICATION

This application is based on and claims priority under 35 U.S.C. Section 119 to Japanese Patent Application No. 2021-066604 filed on Apr. 9, 2021, the entire content of which are incorporated herein by reference.

TECHNICAL FIELD

The present disclosure relates to a valve timing control unit.

BACKGROUND ART

A variable valve device and so on shown in JP2004-332671A, JP2008-286120A and JP2019-157679A described below are known for four-cycle type engines that serve as internal combustion engines, which are used to adjust the opening and closing timing of an intake valve or an exhaust valve.

JP2004-332671A discloses a variable valve device whose valve lift characteristics are determined by the rotational position of a control shaft that is provided with an eccentric cam so that the lift amount and operating angle (lift characteristics) of the intake valve are continuously and simultaneously controlled. In this device, control is performed in a mode in which the lift characteristics are set by driving the control shaft, using an actuator that is linked therewith by a worm gear mechanism.

In particular, JP2004-332671A discloses that, when the target rotation position of the control shaft has been maintained at a constant value for a predetermined period, the actuator is controlled so that the control shaft is forcibly reciprocated with a minute amplitude.

Also, JP2008-286120A discloses a variable valve timing mechanism that linearly operates a planetary shaft screwed to a nut, by rotationally driving the nut using an electric motor, to change the maximum lift amount of the intake valve. Also, JP2008-286120A discloses a control mode in which an electric motor is rotated positively and negatively if the maximum lift amount exceeds a predetermined value when the maximum lift amount has been changed.

JP2019-157679A discloses a valve timing control device in which a driving rotary body that rotates integrally with a crankshaft and a driven rotary body that rotates integrally with a camshaft are coaxially arranged, and that includes a deceleration mechanism that has an input gear, an output gear, an Oldham coupling, and the like to set the relative rotation phases of the driving rotary body and the driven rotary body, using the drive force of an electric actuator.

PRIOR ART DOCUMENTS

Summary

In valve timing control devices that set the valve timing through a deceleration mechanism using the drive force of an electric actuator (an electric motor), pressure is continuously applied to specific positions of the gears in a state where a predetermined valve timing is maintained. Therefore, the gears are likely to wear at the contact positions thereof. In JP2004-332671A and JP2008-286120A, in order to suppress such wear, control is performed to prevent the gears from wearing at the specific positions, by operating the electric actuator so as to reciprocate.

Such wear is not limited to gears, and for example, as described in JP2019-157679A, it is conceivable that wearing acts on ball type bearings that support the reduction gear, and the balls wear.

That is to say, the deceleration mechanism disclosed in JP2019-157679A is configured to apply pressure from an eccentric member so that some outer teeth of the input gear engage with some inner teeth of the output gear, and therefore there is concern that an excessive biased force acts on the bearing from a radial direction, causing the balls to wear and impairing smooth operation.

For such a reason, a valve timing control unit capable of suppressing bearing wear is required.

A valve timing control unit in accordance with one or more embodiments of the present invention lies in at least one valve timing control mechanism including: a driving rotary body configured to rotate integrally with a crankshaft of an internal combustion engine; a driven rotary body that is configured to rotate integrally with a camshaft that opens and closes a valve of a combustion chamber of the internal combustion engine, that is coaxial with a rotation axis of the driving rotary body, and that is disposed so that a relative rotational phase thereof relative to the driving rotary body is changeable with use of a bearing; an electric motor and a deceleration gear each configured to set the relative rotational phase; and a phase sensor unit configured to detect the relative rotational phase of the driving rotary body and the driven rotary body as an actual phase with respect to the rotation axis as a center; and a controller configured to control the electric motor to reduce a phase difference between the actual phase detected by the phase sensor unit and a target phase, wherein the controller includes a swing controller configured to swing the target phase in vicinity of the target phase in response to (i) the target phase being maintained and (ii) the actual phase having a fluctuation amount held in a holding region, in which the fluctuation amount is less than a present value relative to the target phase.

A force from the cam of the camshaft (cam fluctuation torque) acts on the valve timing control mechanism when the internal combustion engine is operating, and the bearing rotates when a plurality of gears of the deceleration gear continue to rotate by the driving force of the electric motor. Therefore, even if a force from the cam acts, the force is dispersed in a specific region in the circumferential direction of the bearing, and the pressure does not strongly act on a specific position in the circumferential direction of the bearing. In contrast, when the actual phase reaches the vicinity of the target phase and the fluctuation amount of the actual phase decreases, the force from the cam acts on a specific position in the circumferential direction of the bearing. In other words, when the difference between the target phase and the actual phase exceeds the preset value, the phase difference convergence control continues, and therefore, for example, in the case of a rolling bearing, the amount of rotation of the balls is relatively large, and it is possible to suppress the inconvenience of a strong force continuously acting on specific portions of the balls or the races. However, when the difference is reduced through phase difference convergence control, for example, the amount of rotation of the balls in the rolling bearing is reduced and the pressure is locally applied, which results in wear.

For this reason, when the target phase is maintained and the fluctuation amount of the actual phase is kept to be less than the preset value, the bearing is positively rotated by performing phase swing control to swing the target phase in the vicinity of the target phase, thereby expanding the region in which the pressure in the circumferential direction of the bearing acts, and eliminating the inconvenience that a strong force continuously acts on a specific portion of the bearing.

Therefore, a valve timing control unit that can suppress bearing wear is formed.

In addition to the above-described configuration, the swing controller may set two swing target phases obtained by displacing a value of the target phase toward an advance side and a retard side by an equal amount, and swing the target phase back and forth between the swing target phases in preset cycles.

As a result, it is possible to swing the target phase back and forth in cycles with the preset period, suppress the wear of the bearing, and maintain the average value of the swung target phase at the original target phase. Therefore, the average valve timing can be maintained at the original valve timing.

In addition to the above-described configuration, the phase sensor unit may include a crank angle sensor configured to detect a rotation angle of the crankshaft, a camshaft angle sensor configured to detect a rotation angle of the camshaft, and a computation unit configured to obtain the actual phase from detection signals from the crank angle sensor and the camshaft angle sensor, and the valve timing control unit may uses as the fluctuation amount an absolute value of a difference between a maximum value and a minimum value of the actual phase both obtained by the computation unit.

The cam fluctuation torque acts on the driven rotary body from the camshaft, and therefore the rotation speed increases or decreases in cycles with a predetermined period, and the actual phase also fluctuates accordingly. Therefore, the actual phase can be obtained by the controller based on the detection value of the crank angle sensor and the detection value of the camshaft angle sensor, and the absolute value of the difference between the maximum value and the minimum value of the obtained actual phase can be defined as the fluctuation amount.

In addition to the above-described configuration, the swing controller may set a swing amount of the target phase to a value larger than the fluctuation amount by which the actual phase fluctuates in the holding region.

With this configuration, the swing amount of the target phase set by the swing controller becomes larger than the fluctuation amount of the actual phase in the state where the actual phase of the valve timing control mechanism is held in the holding region. Therefore, the region in which the pressure acts on the bearing or the gear can be expanded, and the inconvenience that the pressure acts locally on a specific portion of the bearing or the gear can be reliably eliminated.

In addition to the above-described configuration, the valve timing control unit may further include a rotation speed detector configured to detect a rotation speed of the crankshaft per unit time, and the swing controller may start swinging the target phase in response to the rotation speed detected by the rotation speed detector exceeding a preset value.

When the valve timing control mechanism rotates at a relatively low rotation speed (the rotation speed per unit time), the driving rotary body and the driven rotary body naturally swing in the rotation direction (the rotation speed increases or decreases), and "fluctuation" in which the actual phase fluctuates occurs. The amplitude of this "fluctuation" tends to decrease as the rotation speed of the crankshaft increases. Therefore, when the rotation speed detected by the rotation speed detector is low, the area in which pressure acts on the bearing or gear is expanded without control by the swing controller, and it is possible to suppress the inconvenience that a strong force continuously acts on a specific portion of the bearing or the gear. However, when the rotation speed increases, it is difficult to suppress such an inconvenience.

For such a reason, by performing phase swing control when the rotation speed exceeds the preset value, it is possible to expand the area where the pressure acts on the bearing and the gear, and eliminate the inconvenience that a strong force continuously acts on a specific portion in the circumferential direction of the bearing.

In addition to the above-described configuration, the internal combustion engine may include as the at least one valve timing control mechanism: an intake-side valve timing control mechanism configured to control opening and closing timing of an intake valve; and an exhaust-side valve timing control mechanism configured to control opening and closing timing of an exhaust valve, and the controller may cause the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

With this configuration, when performing phase swing control, the target phase of the intake-side valve timing control mechanism and the target phase of the exhaust-side valve timing control mechanism are simultaneously swung in the same swing direction. Therefore, the relationship between the intake timing of the intake valve and the exhaust timing of the exhaust valve can be maintained. In particular, in the case where an overlap range is set between the opening and closing timing (valve timing) of the intake-side valve timing control mechanism and the opening and closing timing (valve timing) of the exhaust-side valve timing control mechanism, the range length of the overlap range can be maintained, and desirable intake and exhaust can be performed.

In addition to the above-described configuration, the internal combustion engine may include as the at least one valve timing control mechanism: an intake-side valve timing control mechanism configured to control opening and closing timing of an intake valve and an exhaust-side valve timing control mechanism configured to control opening and closing timing of an exhaust valve, the internal combustion engine may have an overlap range, which results from the intake-side valve timing control mechanism opening the intake valve before the exhaust-side valve timing control mechanism closes the exhaust valve, and with a first one of the intake-side valve timing control mechanism or the exhaust-side valve timing control mechanism having opening and closing timing displaced in such a direction as to expand the overlap range, the swing controller may swing the target phase of a second one of the intake-side valve timing control mechanism and the exhaust-side valve timing control mechanism.

With this configuration, one of the opening and closing timing of the intake-side valve timing control mechanism and the exhaust-side valve timing control mechanism is displaced in the direction in which the overlap range expands, and the other of the intake-side valve timing control mechanism and the exhaust-side valve timing control mechanism is swung through swing control. As a result, even at the timing when the overlap range decreases, it is possible to secure the overlap range required for the intake and exhaust to and from the combustion chamber, and the intake and exhaust performance of the internal combustion engine will not be deteriorated.

In addition to the above-described configuration, the internal combustion engine may include as the at least one valve timing control mechanism an intake-side valve timing control mechanism configured to control opening and closing timing of an intake valve, and include an electric throttle configured to control an amount of intake air to be supplied to the combustion chamber, and when the swing controller swings the target phase of the intake-side valve timing control mechanism, the controller may operate to increase the amount of intake air with use of the throttle in conjunction with an increase in an amount of displacement of the intake-side valve timing control mechanism in an advance direction.

With this configuration, when the phase swing control is performed by the intake-side valve timing control mechanism, if the intake timing of the intake-side valve timing control mechanism is displaced in the advance direction to increase the intake amount, the flow rate is increased using the throttle according to the amount of displacement in the advance direction, and thus the inconvenience of insufficient intake air in the combustion chamber can be eliminated.

In addition to the above-described configuration, the internal combustion engine may include a fuel injection device configured to supply fuel to the combustion chamber, and in response to the amount of intake air being changed with use of the throttle, the controller may control an amount of fuel to be injected by the fuel injection device.

With this configuration, when the amount of intake air from the intake valve increases or decreases in conjunction with the control performed by the swing controller, the amount of fuel to be injected by the fuel injection device is increased or decreased so that a constant air-fuel ratio is maintained and desirable combustion can be realized.

BRIEF DESCRIPTION OF DRAWINGS

FIG. 1 is a diagram showing a cross section of an engine and a control unit.

DESCRIPTION OF EMBODIMENTS

Hereinafter, embodiments of the present invention will be described based on the drawings.

[Basic Configuration]

As shown in FIG. 1, a valve timing control unit A includes an intake-side variable valve timing mechanism VTa (an example of the intake-side valve timing control mechanism) that sets the valve timing (the opening and closing timing) of an intake valve Va of an engine E that is as an internal combustion engine, and an exhaust-side variable valve timing mechanism VTb (an example of the exhaust-side valve timing control mechanism) that sets the valve timing (the opening and closing timing) of an exhaust valve Vb of the engine E as well as an engine control device 40 (an example of the controller) that controls the intake-side variable valve timing mechanism VTa and the exhaust-side variable valve timing mechanism VTb.

The engine E (an example of the internal combustion engine) is an engine that is provided in a vehicle to obtain a travel drive force of a passenger car or the like. The engine control device 40 not only controls a variable valve timing mechanism VT (an upper concept of the intake-side variable valve timing mechanism VTa and the exhaust-side variable valve timing mechanism VTb), but also controls the start of the engine E and the stop of the engine E. In particular, when a predetermined condition is satisfied in a situation where the engine E is operating, the engine control device 40 controls swing control to swing an target phase T (see FIG. 4) of the variable valve timing mechanism VT (swing the actual phase P back and forth between the advance side and the retard side) to suppress wear of the bearings and gears of the variable valve timing mechanism VT. This control mode will be described later.

[Engine]

Figure 2:
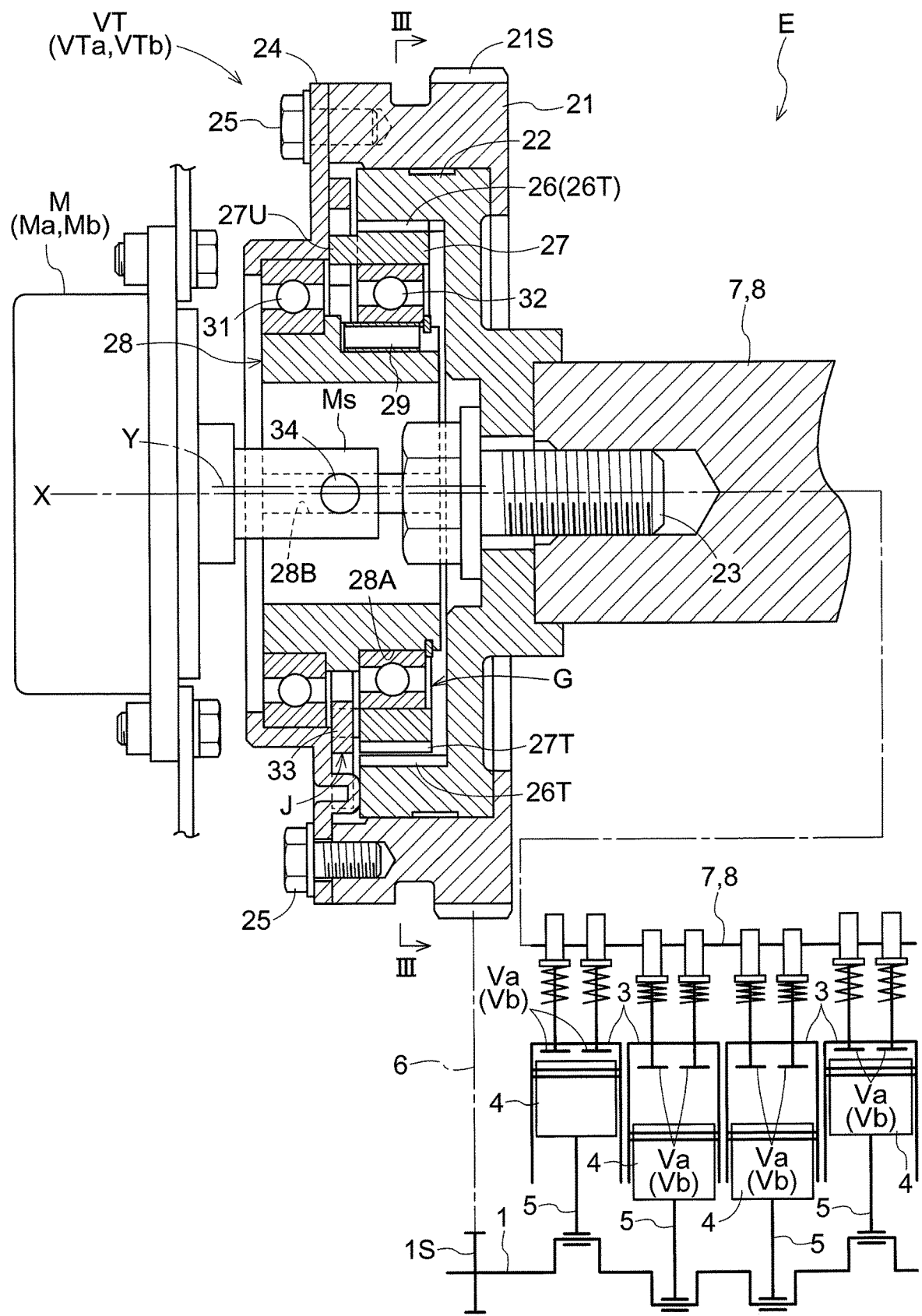
FIG. 2 is a cross-sectional view of a valve timing control mechanism.

As shown in FIGS. 1 and 2, the engine E is configured as a four-cycle type engine in which a cylinder head 3 is coupled to an upper portion of a cylinder block 2 that supports a crankshaft 1 so as to be rotatable, pistons 4 are housed in a plurality of cylinder bores formed in the cylinder block 2 so as to be able to move back and forth, and each piston 4 is coupled to the crankshaft 1 using a connecting rod 5.

The cylinder head 3 includes the intake valve Va and the exhaust valve Vb, and an intake camshaft 7 for controlling the intake valve Va and an exhaust camshaft 8 for controlling the exhaust valve Vb are provided above the cylinder head 3. In addition, a timing belt 6 is wound around an output pulley 1S for the crankshaft 1 and two drive pulleys 21S for the intake-side variable valve timing mechanism VTa and the exhaust-side variable valve timing mechanism VTb, respectively.

The cylinder head 3 is provided with an injector 9 (an example of the fuel injection device) for injecting fuel into a combustion chamber, and a spark plug 10. An intake manifold 11 that supplies air to the combustion chamber via the intake valve Va and an exhaust manifold 12 that sends out a combustion gas in the combustion chamber via the exhaust valve Vb are coupled to the cylinder head 3.

Furthermore, an electric throttle 13 that adjusts the intake air amount through control that is performed by a throttle control motor 13a is provided upstream of the intake manifold 11, and a catalyst 14 that purifies the exhaust gas is provided at an intermediate position in the exhaust manifold 12. The engine E includes a starter motor 15 (see FIG. 2) that rotationally drives the crankshaft 1 when starting up.

[Variable Valve Timing Mechanism]

The intake-side variable valve timing mechanism VTa (the intake-side valve timing control mechanism) and the exhaust-side variable valve timing mechanism VTb (the exhaust-side valve timing control mechanism) have the same configuration. Therefore, in FIGS. 2 and 3, the same configurations are marked with the same reference numerals, and parts that need to be distinguished from each other are marked with reference numerals that enable them to be distinguished from each other.

Figure 3:
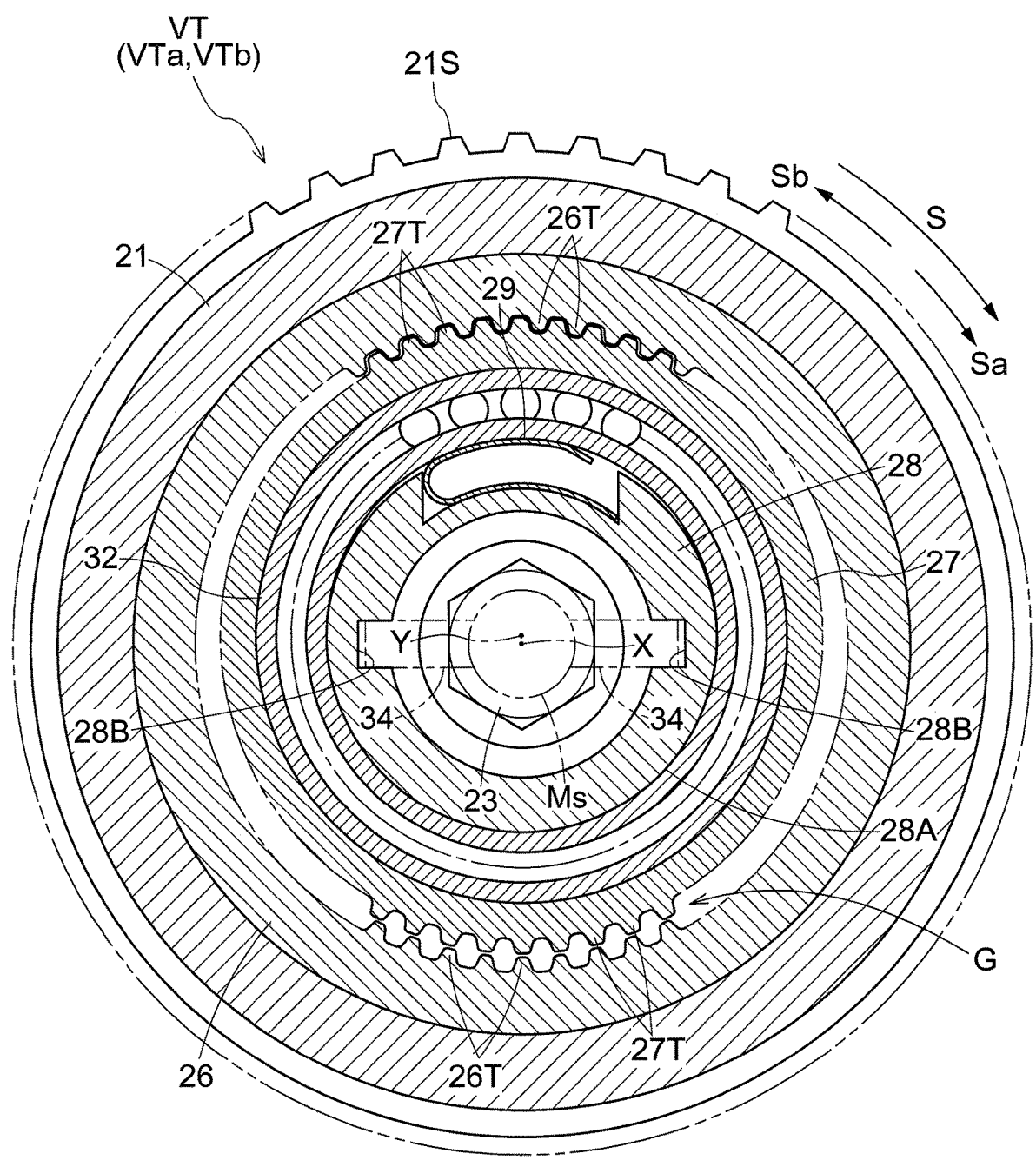
FIG. 3 is a cross-sectional view taken along the III-Ill line in FIG. 2.

As shown in FIGS. 2 and 3, the variable valve timing mechanism VT includes a drive case 21 (an example of the intake driving rotary body/the exhaust driving rotary body) and an internal rotor 22 (an example of the intake driven rotary body/the exhaust driven rotary body) that are coaxial with a rotation axis X of the intake camshaft 7 or the exhaust camshaft 8, and includes a phase adjustment mechanism G (an example of the deceleration gear) that controls the relative rotation phases thereof using the drive force of a phase control motor M (an upper concept of an intake-side phase control motor Ma and an exhaust-side phase control motor Mb) that is an electric motor.

The drive case 21 has a drive pulley 21S formed on the outer circumference thereof. The internal rotor 22 is enclosed in the drive case 21, and is coupled and fixed to the intake camshaft 7 or the exhaust camshaft 8 using a coupling bolt 23. With this configuration, the drive case 21 is supported on the outer circumference portion of the internal rotor 22 so as to be able to rotate relative thereto, and the internal rotor 22 rotates together with the camshaft corresponding thereto (the intake camshaft 7 or the exhaust camshaft 8).

A front plate 24 is fastened at a position where the front plate 24 covers the opening of the drive case 21, using a plurality of fastening bolts 25. With this configuration, the phase adjustment mechanism G and the internal rotor 22 are restricted by the front plate 24 from being displaced in the direction along the rotation axis X.

As shown in FIGS. 1 and 3, the entire variable valve timing mechanism VT is rotated in a drive rotation direction S by the drive force from the timing belt 6. Also, the driving force of the phase control motor M is transmitted to the internal rotor 22 via the phase adjustment mechanism G, so that the relative rotational phase of the internal rotor 22 relative to the drive case 21 is displaced. The displacement direction of such a displacement toward the same direction as the drive rotation direction S is referred to as an advance direction Sa, and the opposite direction is referred to as a retard direction Sb.

[Variable Valve Timing Mechanism: Phase Adjustment Mechanism]

The phase adjustment mechanism G includes a ring gear 26 formed on the inner circumference of the inner rotor 22 coaxially with the rotation axis X, an inner gear 27 provided so as to be rotatable on the inner circumference side of the inner rotor 22 coaxially with an eccentric axis Y, an eccentric cam 28 provided on the inner circumference side of the inner gear 27, the front plate 24, and a coupling J. The eccentric axis Y is formed so as to be parallel to the rotation axis X.

The ring gear 26 has a plurality of inner teeth 26T, and the inner gear 27 has a plurality of outer teeth 27T. By positioning the inner gear 27 along an eccentric cam surface 28A on the outer circumference of the eccentric cam 28, the inner gear 27 is positioned coaxially with the eccentric axis Y, and some of the outer teeth 27T engage with the inner teeth 26T of the ring gear 26. The phase adjustment mechanism G is configured as an internal planetary gear deceleration device of which the number of teeth of the outer tooth 27T of the inner gear 27 is smaller than that of the inner tooth 26T of the ring gear 26 by one.

The coupling J has a coupling member 33 made of pressed steel plate material, and is configured as a coupling of the Oldham coupling type with the outer circumference of the coupling member 33 engaging with the drive case 21 and the inner circumference of the coupling member 33 engaging with an engagement protrusion 27U of the inner gear 27. As a result, the coupling J realizes an operation of rotating the inner gear 27 and the drive case 21 integrally with each other, while maintaining the positional relationship in which the inner gear 27 is eccentric with respect to the drive case 21.

The eccentric cam 28 has a cylindrical shape as a whole, and a pair of engagement grooves 28B are formed in the inner circumference thereof so as to be parallel to the rotation axis X. The eccentric cam 28 is supported by a first bearing 31 (an example of the bearing) that functions as a rolling bearing relative to the front plate 24 so as to rotate coaxially with the rotation axis X. Furthermore, the eccentric cam surface 28A is formed on the outer circumference of a portion that is on the intake camshaft 7 side from the supporting position of the first bearing 31.

The eccentric cam surface 28A is formed in a circular shape (the cross section thereof has a circular shape) that is centered about the eccentric axis Y so as to be parallel to the rotation axis X. The inner gear 27 is rotatably supported by a second bearing 32 (an example of the bearing) that functions as a rolling bearing on the outer circumference of the eccentric cam surface 28A. Also, a spring 29 is fitted into a recess formed in the eccentric cam surface 28A, and a biasing force of the spring 29 is applied to the inner gear 27 via the second bearing 32. With such a configuration, some of the outer teeth 27T of the inner gear 27 engage with some of the inner teeth 26T of the ring gear 26, and the engagement state is maintained by the biasing force of the spring 29.

The phase control motor M is supported by the engine E, and an engagement pin 34 formed on an output shaft Ms is fitted into the engagement grooves 28B in the inner circumference of the eccentric cam 28. Although not shown in detail, the phase control motor M is configured as a brushless type motor that has the same structure as a three-phase motor, including a rotor that has a permanent magnet, a stator that has a plurality of field coils arranged at positions surrounding the rotor, and the output shaft Ms to which the rotation of the rotor is transmitted.

In this variable valve timing mechanism VT, when the engine E is operating, the output shaft Ms is driven to rotate in the drive rotation direction S at the same speed as the camshaft to maintain the relative rotation phase of the variable valve timing mechanism VT. When the relative rotation phase is to be displaced in the advance direction Sa, control is performed so that the rotation speed of the output shaft Ms is reduced, and when the relative rotation phase is to be displaced in the retard direction Sb, control is performed so that the rotation speed of the output shaft Ms is increased.

In the situation where the engine E is stopped, the outer teeth 27T of the inner gear 27 engage with the inner teeth 26T of the ring gear 26 in the phase adjustment mechanism G, and therefore, when the eccentric cam 28 rotates about the rotational axis X due to the rotation of the output shaft Ms driven by phase control motor M, the inner gear 27 accordingly revolves about the rotational axis X while rotating about the eccentric axis Y.

In addition, each time the inner gear 27 makes one rotation (revolution) about the rotation shaft X, the inner gear 27 rotates relative to the ring gear 26 (rotation) by an angle corresponding to the difference in the number of teeth between the inner gear 27 and the ring gear 26, and thus a large amount of deceleration is realized. As a result, by controlling the rotation speed of the phase control motor M, the drive case 21 that rotates integrally with the inner gear 27 via the coupling J, and the camshaft coupled to the ring gear 26 by the coupling bolt 23, are rotated relative to each other, so that valve timing adjustment is realized.

[Control Configuration]

As shown in FIGS. 1 and 2, the engine E includes the starter motor 15 that drives and rotates the crankshaft 1, a crank angle sensor 16 provided at a position in vicinity of the crankshaft 1 and capable of detecting the rotation angle of the crankshaft 1 (which also functions as a rotation speed detector), an intake-side camshaft angle sensor 17 provided in vicinity of the intake camshaft 7 and capable of detecting the rotation angle of the intake camshaft 7, and an exhaust-side camshaft angle sensor 18 provided in vicinity of the exhaust camshaft 8 and capable of detecting the rotation angle of the exhaust camshaft 8.

The crank angle sensor 16, the intake-side camshaft angle sensor 17, and the exhaust-side camshaft angle sensor 18 are configured as pickup type sensors that intermittently output pulse signals in response to rotations. The crank angle sensor 16 counts pulse signals with reference to the rotation reference of the crankshaft 1 when the crankshaft 1 rotates, to acquire the angle of rotation from the rotation reference. Similarly, intake-side camshaft angle sensor 17 and the exhaust-side camshaft angle sensor 18 are configured to count pulse signals with reference to the rotation reference of the intake camshaft 7 when the intake camshaft 7 rotates, to acquire the angle of rotation from the rotation reference, in the engine control device 40.

With such a configuration, for example, the count value of the crank angle sensor 16 and the count value of the intake-side camshaft angle sensor 17 or the exhaust-side camshaft angle sensor 18 are stored in the state where, for example, the drive case 21 and the internal rotor 22 shown in FIG. 3 are in a predetermined reference phase (for example, an intermediate phase) so that the relative rotational phase can be acquired by comparing the two kinds of count values, regardless of whether the relative rotation phase is displaced from the reference phase toward the advance side (in the advance direction Sa) or the retard side (in the retard direction Sb).

As described above, the crank angle sensor 16 and the intake-side camshaft angle sensor 17 constitute an intake-side phase sensor unit Is, and the crank angle sensor 16 and the exhaust-side camshaft angle sensor 18 constitute an exhaust-side phase sensor unit Es.

As shown in FIG. 1, the engine control device 40 receives detection signals from the crank angle sensor 16, the intake-side camshaft angle sensor 17, and the exhaust-side camshaft angle sensor 18, as well as detection signals from a main switch 45 and an accelerator pedal sensor 47. The engine control device 40 outputs control signals to the starter motor 15, the phase control motor M (the intake-side phase control motor Ma and the exhaust-side phase control motor Mb), a combustion manager 19, and the throttle control motor 13a.

The engine control device 40 includes an engine controller 41, a phase controller 42 (an example of the computation unit), a swing controller 43, and a correction controller 44. Although these components are formed using software, some of them may be formed only using hardware, and they may be formed using a combination of hardware and software.

Figure 6:
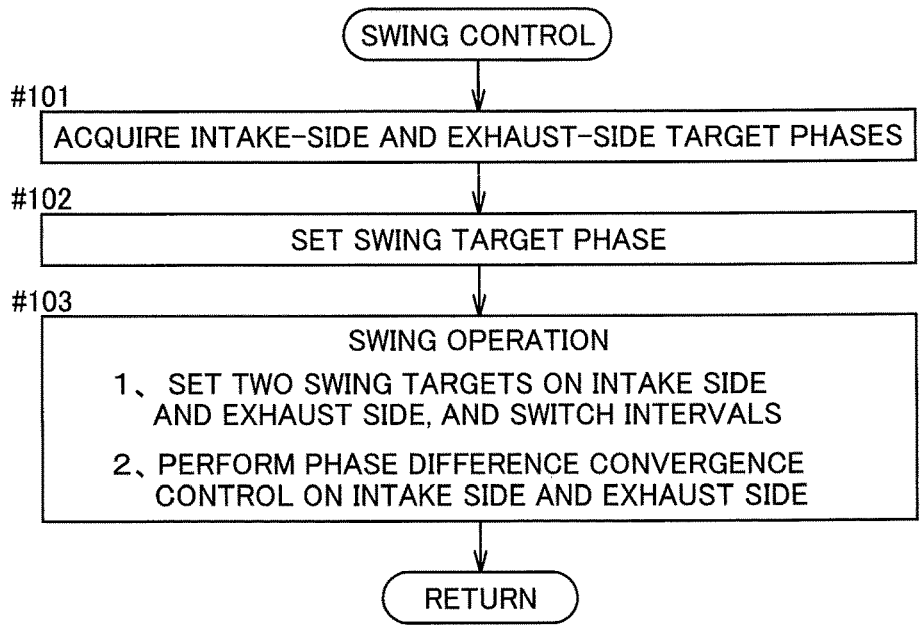
FIG. 6 is a flowchart for swing control.

The engine controller 41 performs control from the start to the stop of the engine E, and the phase controller 42 controls the valve timing (opening and closing timing) of the intake-side variable valve timing mechanism VTa and the exhaust-side variable valve timing mechanism VTb when the engine E is to be started, during the operation of the engine E, and when the engine E is to be stopped. The swing controller 43 suppresses wear of the bearings (the first bearing 31 and the second bearing 32) and the gears (the ring gear 26 and the inner gear 27) by performing the swing control shown in the flowchart in FIG. 6. The correction controller 44 corrects the intake air amount or the like when the swing controller 43 performs control.

In this control configuration, the main switch 45 is provided on the panel of the driver's seat of the vehicle, and enables the engine E to be started through human operation and completely stopped through human operation. The accelerator pedal sensor 47 acquires the amount of depression of the accelerator pedal (not shown). The combustion manager 19 manages the operation of a pump or the like that supplies fuel to the injectors 9, as well as the order of ignition and ignition timing by controlling an ignition circuit that supplies power to the spark plugs 10.

[Control Mode]

The intake-side variable valve timing mechanism VTa and the exhaust-side variable valve timing mechanism VTb are provided with the eccentric cam 28 so that some of the inner teeth 26T of the ring gear 26 and some of the outer teeth 27T of the inner gear 27 engage with each other, and the biasing force of the spring 29 is applied from this eccentric cam 28.

With such a configuration, the ring gear 26 and the inner gear 27 are held in an eccentric positional relationship with respect to each other, and, in addition, a strong force acts on the first bearing 31 and the second bearing 32 that make the relative rotation phase displaceable, and at the same time, a strong force acts on the contact surface between the inner teeth 26T and the outer teeth 27T.

In particular, since the first bearing 31 and the second bearing 32 have a structure in which a plurality of balls are arranged between the inner race and the outer race thereof, and therefore, when the pressure caused by cam fluctuation torque acts on the first bearing 31 and the second bearing 32 in the situation where the engine E is operating, the balls are brought into pressure contact with the inner race and the outer race in a radial direction, and the balls may wear.

Similarly, the pressure caused by cam fluctuation torque acts on the contact surface between the inner teeth 26T and the outer teeth 27T in the situation where the engine E is operating, and therefore the contact surface may wear.

Figure 5:
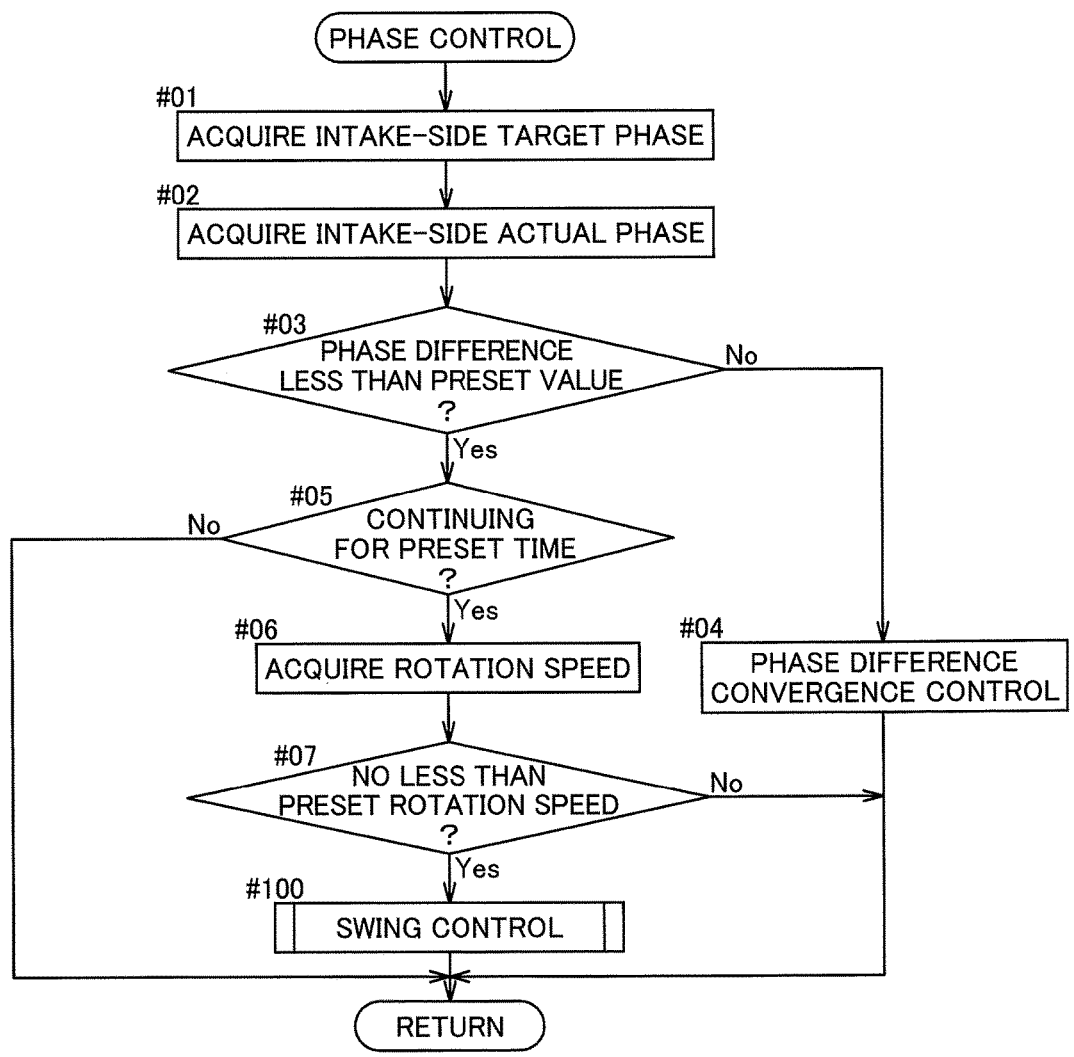
FIG. 5 is a flowchart for phase control.

In order to suppress such wear, the engine control device 40 performs the control shown in the flowchart in FIG. 5. This flowchart shows a control mode of phase control that is performed to control the intake-side variable valve timing mechanism VTa in order to control the valve timing (the opening and closing timing) of the intake valve Va in the situation where the engine E is operating.

That is to say, the engine control device 40 acquires the target phase T that is set based on information such as the amount of depression of the accelerator pedal detected by the accelerator pedal sensor 47 or the rotation speed counted by the crank angle sensor 16 (the rotation speed of the crankshaft 1 per unit time) (step #01), and acquires the actual phase P of the intake-side variable valve timing mechanism VTa based on the count value of the crank angle sensor 16 and the count value of the intake-side camshaft angle sensor 17 (step #02).

These steps #01 and #02 are carried out by the phase controller 42. Whether the phase difference between the target phase T acquired as described above and the actual phase P is less than a preset value (for example, 1.0CA to 1.2CA) or no less than the preset value is determined (step

03). This step #03 is carried out by the phase controller 42. When it is determined that the phase difference is not less than the preset value (No in step #03), phase difference convergence control is performed (control is performed to operate the intake-side phase control motor Ma so as to reduce the phase difference) (step #04), and thereafter processing exits the phase control and returns. This step #04 is carried out by the phase controller 42.

Figure 4:
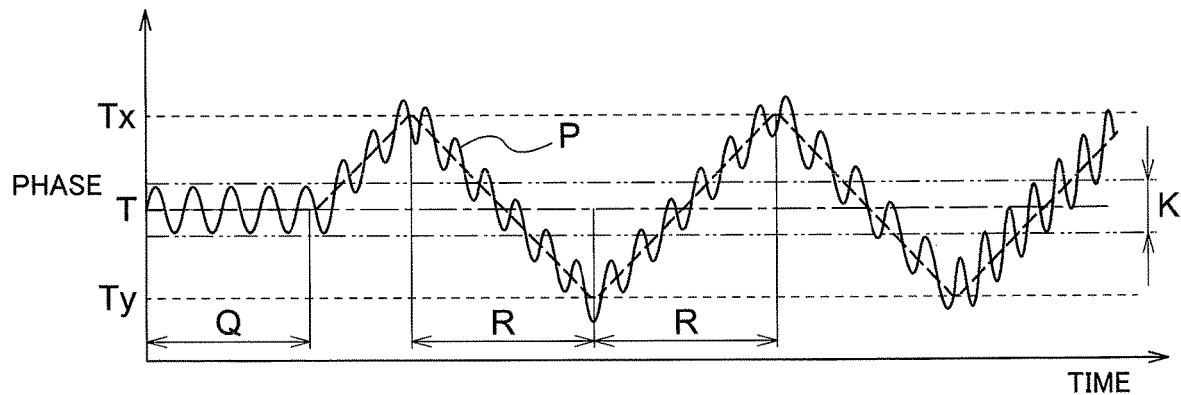
FIG. 4 is a chart showing fluctuation of an actual phase.

In particular, as shown in FIG. 4, in phase difference convergence control, a holding region K is set between the advance side and the retard side with reference to the target phase T, and the phase difference convergence control (control in step #04) ends (stops) when the state in which the actual phase P is included in the holding region K is reached. The holding region K is set in a relatively narrow region, and in the state where the phase difference convergence control has converged, a state is reached in which the actual phase P alternately fluctuates between the advance side and the retard side due to the cam fluctuation torque (the rotation speed of the intake camshaft 7 increases and decreases), in a state of being included in the holding region K. Note that an initial region Q in the figure shows a state in which the target phase T and the actual phase P have converged.

If it is determined in step #03 that the phase difference is less than the preset value (Yes in step #03), and this state continues for a preset time (for example, approximately 0.1 seconds) (Yes in step #05), the rotation speed of the crankshaft 1 (the rotation speed per unit time) is acquired, and it is determined whether or not the rotation speed acquired in this way is no less than the set rotation speed (steps #06 and #07). If the phase difference is less than the preset value (Yes in step #03) and the duration of this state is less than the preset time (No in step #05), processing exits the phase control and returns.

If it is determined in step #07 that the rotation speed is no less than the set rotation speed (Yes in step #07), swing control (step #100) is performed, and if the rotation speed is less than the set rotation speed (No in step #07), the control ends and processing returns. Note that steps #05 to #07 constitute processing for determining whether or not it is necessary to transition to swing control, and are carried out by the swing controller 43.

As described above, swing control (step #100) is carried out when the phase difference is less than the preset value (in the converged state), this state continues for more than the preset time, and the rotation speed of the crankshaft 1 is no less than the set rotation speed.

Swing control (step #100) is set as a subroutine, and is basically carried out by the swing controller 43. Specifically, as shown in the flowchart in FIG. 6, the intake-side and exhaust-side target phases T (see FIG. 4, which shows only one of the intake-side and exhaust-side target phases T) are acquired, and swing target phases Tx and Ty that are separated by an equal amount from the two acquired target phases T are set (steps #102 and #103).

In addition, in the timing chart in FIG. 4, the swing target phases Tx and Ty are set so that the amplitudes thereof with reference to the target phase T are equal in the advance direction and the retard direction (in the vertical directions in FIG. 4). The interval between the swing target phases Tx and Ty in the swing directions (the vertical directions in FIG. 4) is the swing amount of the target phase T, and this swing amount is set to be larger than the fluctuation amount of the actual phase P caused due to the action of the cam fluctuation torque.

The rotation speed of the intake camshaft 7 alternately fluctuates in the advance direction and the retard direction due to the action of the cam fluctuation torque, and therefore the rotation speed increases or decreases in short cycles. Therefore, the actual phase P fluctuates in a wave shape with a predetermined amplitude as indicated by the solid line in the timing chart in FIG. 4, and the amplitude of this fluctuation is the fluctuation amount.

The fluctuation amount of the actual phase P is small, and therefore, if the state in which the actual phase P is included in the holding region K continues, wear may occur due to the pressure acting locally on the balls of the first bearing 31 and the second bearing 32. Therefore, in order to suppress this wear, it is desirable to rotate the balls by a predetermined angle (for example, 45 degrees, 90 degrees, or the like) or more through swing control. For this reason, the swing target phases Tx and Ty are set so that the balls are rotated by a predetermined angle or more, and the values of the swing target phases Tx and Ty are set to be larger than the fluctuation amount by which the actual phase P fluctuates in the holding region K.

After the swing target phases Tx and Ty are set in this way, swing operation processing (step #103) is carried out. Note that the phase difference convergence control carried out in step #103 only uses the phase difference convergence control routine in order to swing the drive case 21 and the internal rotor 22, and it is different from the control performed to converge the actual phase P to the target phase T (the holding region K).

For example, if the swing target phase Tx is on the advance side with respect to the target phase T and the swing target phase Ty is on the retard side with respect to the target phase T, in the swing operation (step #103), the two swing target phases Tx and Ty are switched in cycles with a preset period R, and phase difference convergence control is performed so that the throttle 13 is controlled in response to the fluctuation of the intake air volume resulting from such control. Such control of the throttle 13 is performed by the correction controller 44.

In the control performed in step #103, the two swing target phases Tx and Ty that are set on the advance side (the advance direction Sa) and the retard side (the retard direction Sb) are switched in cycles with the same preset period R, and phase difference convergence control is performed using the intake-side variable valve timing mechanism VTa and the exhaust-side variable valve timing mechanism VTb. As a result, the phase moves back and forth by the same amount so as to follow the pattern indicated by the peaks and valleys in the broken line in the timing chart in FIG. 4. After the control in step #103, processing returns to the phase control in FIG. 5. The swing target phases Tx and Ty and the preset period R may be set based on the state of the engine (the rotation speed and the load).

Figure 7:
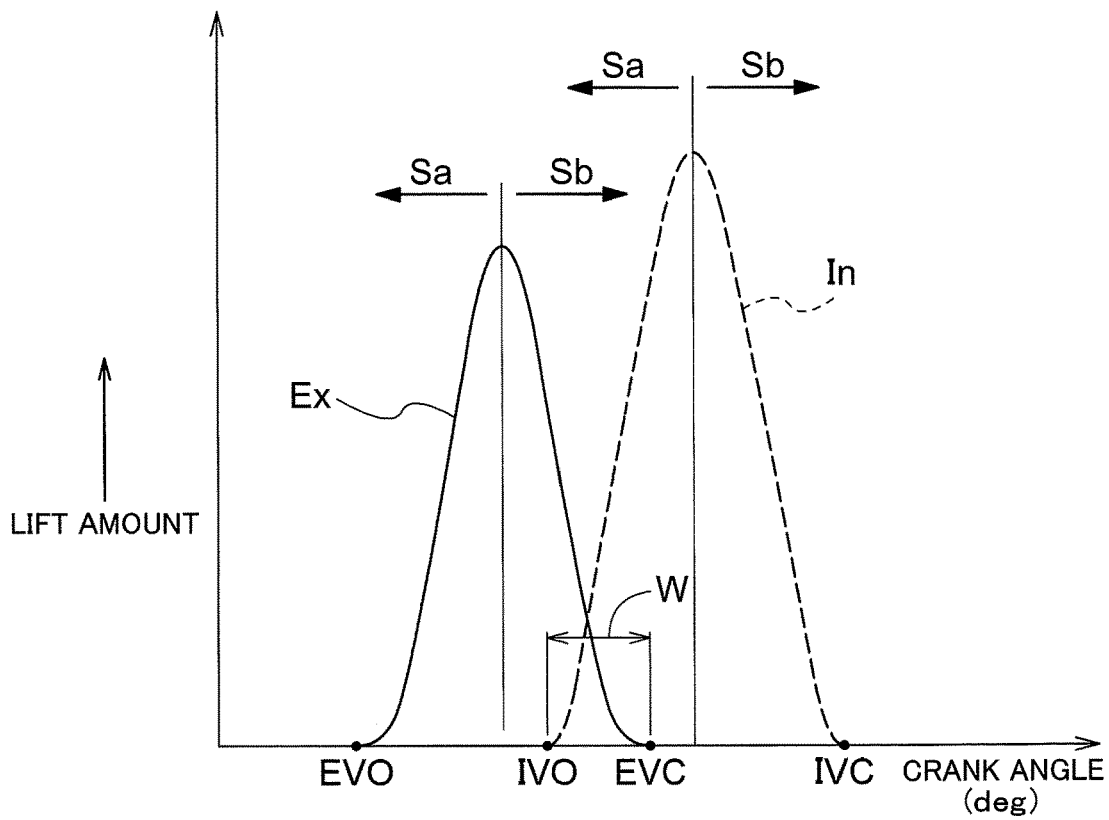
FIG. 7 is a chart showing valve timing and an overlap range.

In particular, in this swing operation, as shown in FIG. 7, an exhaust valve timing Ex of the exhaust-side variable valve timing mechanism VTb and an intake valve timing In of the intake-side variable valve timing mechanism VTa move back and forth by the same amount in the same crank angle direction with the same timing.

In this way, as a result of the swing operation being performed, the drive case 21 and the internal rotor 22 swing relative to each other. Therefore, it is possible to suppress the inconvenience in which the balls of the first bearing 31 and the second bearing 32 are brought into press contact with the inner race or the outer race and wear progresses, and the inconvenience in which the inner teeth 26T of the ring gear 26 and the outer teeth 27T of the inner gear 27 are brought into press contact with each other and wear progresses on the pressure contact surfaces thereof. Furthermore, as shown in FIG. 7, the swing operation is performed so that the intake-side variable valve timing mechanism VTa and the exhaust-side variable valve timing mechanism VTb move in the same direction in conjunction with each other (conjunctive operation), and therefore the region length of an overlap range W is not changed, and the intake air amount is not changed.

Note that, in FIG. 7, the initial exhaust valve timing Ex of the exhaust-side variable valve timing mechanism VTb is indicated by a solid line, and the intake valve timing In of the intake-side variable valve timing mechanism VTa is indicated by a broken line. In addition, relating timing is set so that the exhaust valve Vb transitions to a closed state at a valve closing timing EVC of the exhaust valve timing Ex, and before this timing, the intake valve Va transitions to an open state at the valve opening timing IVO of the intake valve timing In. As a result, the range between the valve closing timing EVC and the valve opening timing IVO becomes the overlap range W.

[Timing Chart]

Figure 8:
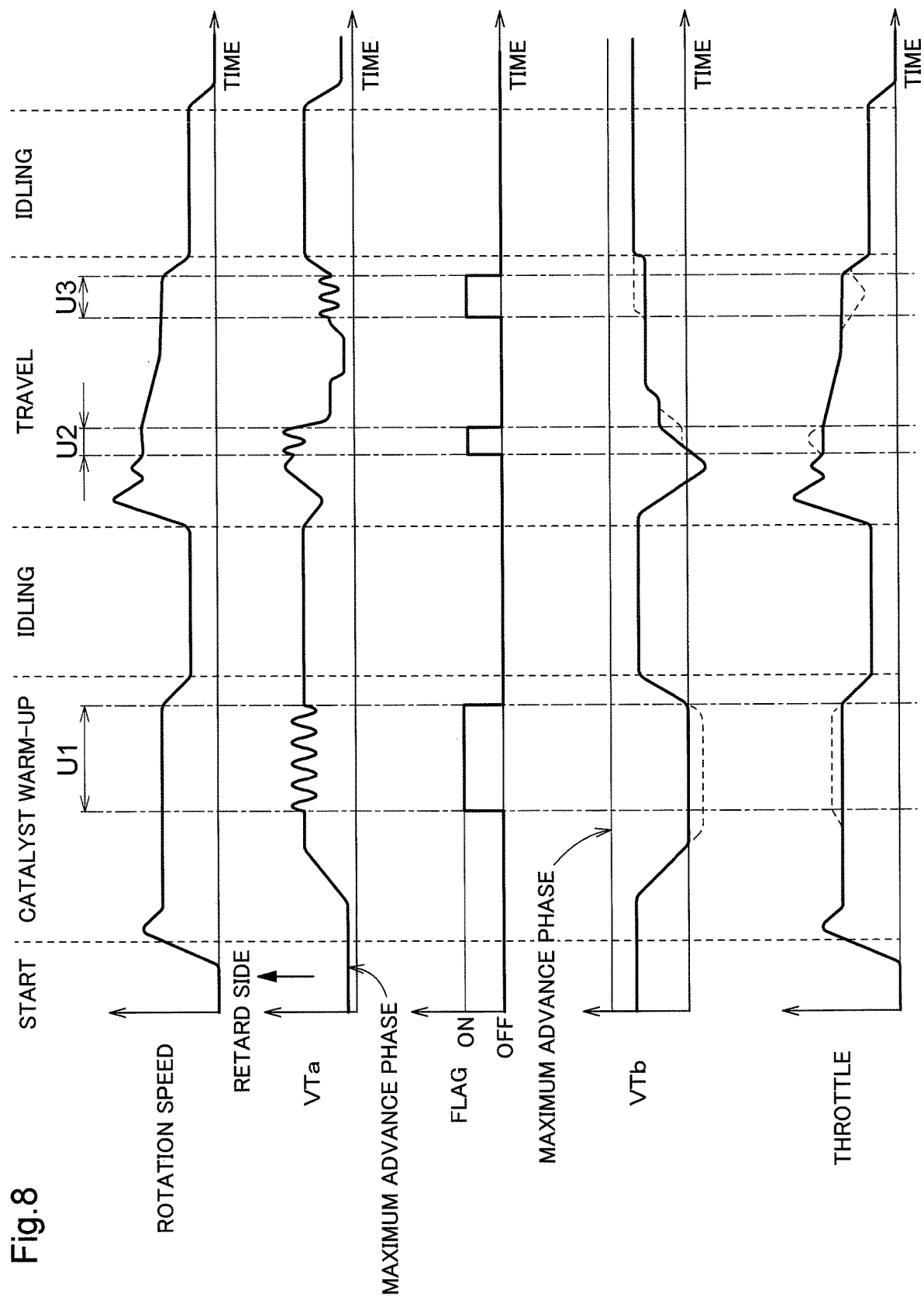
FIG. 8 is a timing chart for the rotation speed of a crankshaft, timing of an intake-side variable valve timing mechanism, a flag, an exhaust-side variable valve timing mechanism, and an opening degree of a throttle.

The timing chart in FIG. 8 shows the rotation speed of the crankshaft 1, the valve timing of the intake-side variable valve timing mechanism VTa, and a flag that is used when the swing control is performed, in the case where the swing control is performed in the process from the start to the stop of the engine E.

Note that this chart also shows the valve timing of the exhaust-side variable valve timing mechanism VTb and the opening degree of the throttle 13, which will be described in another embodiment (b).

As shown in the timing chart in FIG. 8, the valve timing of the intake-side variable valve timing mechanism VTa is in the maximum advance phase when the engine E is to be started, and is changed to the retard side after the engine E is started. Immediately after the engine E is started, the catalyst warm-up is performed in the state where the rotation speed of the crankshaft 1 has been increased to be relatively high.

When setting the valve timing of the intake-side variable valve timing mechanism VTa to the retard side, the predetermined target phase T (see FIG. 4) is set, and the actual phase P converges to the target phase T under the control of the intake-side phase control motor Ma. Therefore, the conditions in steps #03 and #05 described above are satisfied. When these conditions are satisfied, the flag is switched from OFF to ON, and the swing control (step #100 in FIG. 5) is performed.

Although this timing chart shows only the swing control of the intake-side variable valve timing mechanism VTa, the swing control for swinging the actual phase P of the exhaust-side variable valve timing mechanism VTb is performed in the same direction and with the same timing as the intake-side variable valve timing mechanism VTa, in synchronization with the intake-side variable valve timing mechanism VTa, and the overlap range W is maintained constant through this swing control.

Furthermore, the swing control is not performed when the phase difference between the target phase T and the actual phase P is no less than the preset value and when the rotation speed of the crankshaft 1 is low such as when the engine E is in an idle state, and the phase difference between the target phase T and the actual phase P converges to be less than the preset value (step #03). The flag is turned ON in three regions, namely a first region U1, a second region U2, and a third region U3 where the condition is satisfied when, for example, the rotation speed of the crankshaft 1 is high (step #05) as in the situation where a passenger car or the like is running, and swing control is performed for these regions.

[Actions and Effects of Embodiment]

In a state where the difference between the target phase T and the actual phase P is larger than the preset value, phase difference convergence control (control performed to operate the phase control motor M in the direction in which the phase difference is reduced) is performed, and the bearing balls rotate and move between the inner race and the outer race. Therefore, the inconvenience in which the balls are brought into pressure contact at specific positions is suppressed, and such an inconvenience that causes wear does not occur. For the same reason, when phase control is performed, the contact point between the inner teeth 26T and the outer teeth 27T moves, and therefore the inconvenience in which the inner teeth 26T and the outer teeth 27T are brought into pressure contact with each other and wear does not occur.

If the variable valve timing mechanism VT (the intake-side variable valve timing mechanism VTa or the exhaust-side variable valve timing mechanism VTb) rotates at a relatively low rotation speed, the relative rotation speeds between the drive case 21 and the internal rotor 22 naturally increase or decrease relative to each other, and "fluctuation" in which the actual phase P fluctuates occurs. The amplitude (the rotation angle difference) of this "fluctuation" tends to decrease as the rotation speed of the variable valve timing mechanism VT increases. Therefore, when the rotation speed detected by the crank angle sensor 16 (the rotation speed detector) is small, even if the swing control is not performed, the region in which pressure acts on the bearings (the first bearing 31 or the second bearing 32) and the gears (the ring gear 26 and the inner gear 27) is expanded, and the inconvenience in which a strong force acts continuously in the pressure contact direction on a specific portion of the bearings or the gears is suppressed.

In contrast, when the rotation speed of the variable valve timing mechanism VT increases, the amplitude of the "fluctuation" decreases and the pressure acting on the specific portion of the bearings or the gears increases, which causes wear. For this reason, the swing control (step #100) is performed to swing the target phase T when a state is reached by the phase difference convergence control where the relative rotation between the drive case 21 and the internal rotor 22 is hardly performed, and the rotation speed detected by the crank angle sensor 16 reaches a rotation speed no less than the set rotation speed, so that the inconvenience in which a strong force acts continuously in the pressure contact direction on the specific portion of the bearings or the gears is suppressed and wear is eliminated.

In addition, when swing control is to be performed, the intake-side variable valve timing mechanism VTa and the exhaust-side variable valve timing mechanism VTb are swung in the same direction by the same amount in synchronization with each other. Therefore, such control not only reduces wear of the bearings and the gears, but also prevents fluctuations in the intake air amount, and the range length of the overlap range W can be maintained, so the intake/exhaust performance does not fluctuate.

Other Embodiments

Other embodiments of the present invention may be configured as follows instead of being configured as in the above-described embodiment (the components that have the same functions as those in the embodiment above are assigned the same numbers and reference numerals as those in the embodiment above).

(a) When only one of the exhaust-side variable valve timing mechanism VTb and the intake-side variable valve timing mechanism VTa is to perform swing control, in order to maintain the overlap length of the overlap range W to be no less than a preset value, control is performed to move the timing of the other variable valve timing mechanism VT that does not perform swing control in advance so that the overlap length of the overlap range W increases.

This modified embodiment (a) shows, for example, a mode of control in which the exhaust-side variable valve timing mechanism VTb is configured to control the exhaust timing using hydraulic pressure and only the intake-side variable valve timing mechanism VTa is controlled so as to swing. In a specific example, in FIG. 9, the initial exhaust valve timing Ex of the exhaust-side variable valve timing mechanism VTb is indicated by a solid line, and the intake valve timing In of the intake-side variable valve timing mechanism VTa before performing swing control is indicated by a broken line. Also, the region in which the exhaust valve timing Ex and the intake valve timing In overlap each other is shown as an initial overlap range Wp (an example of the overlap range W).

Figure 9:
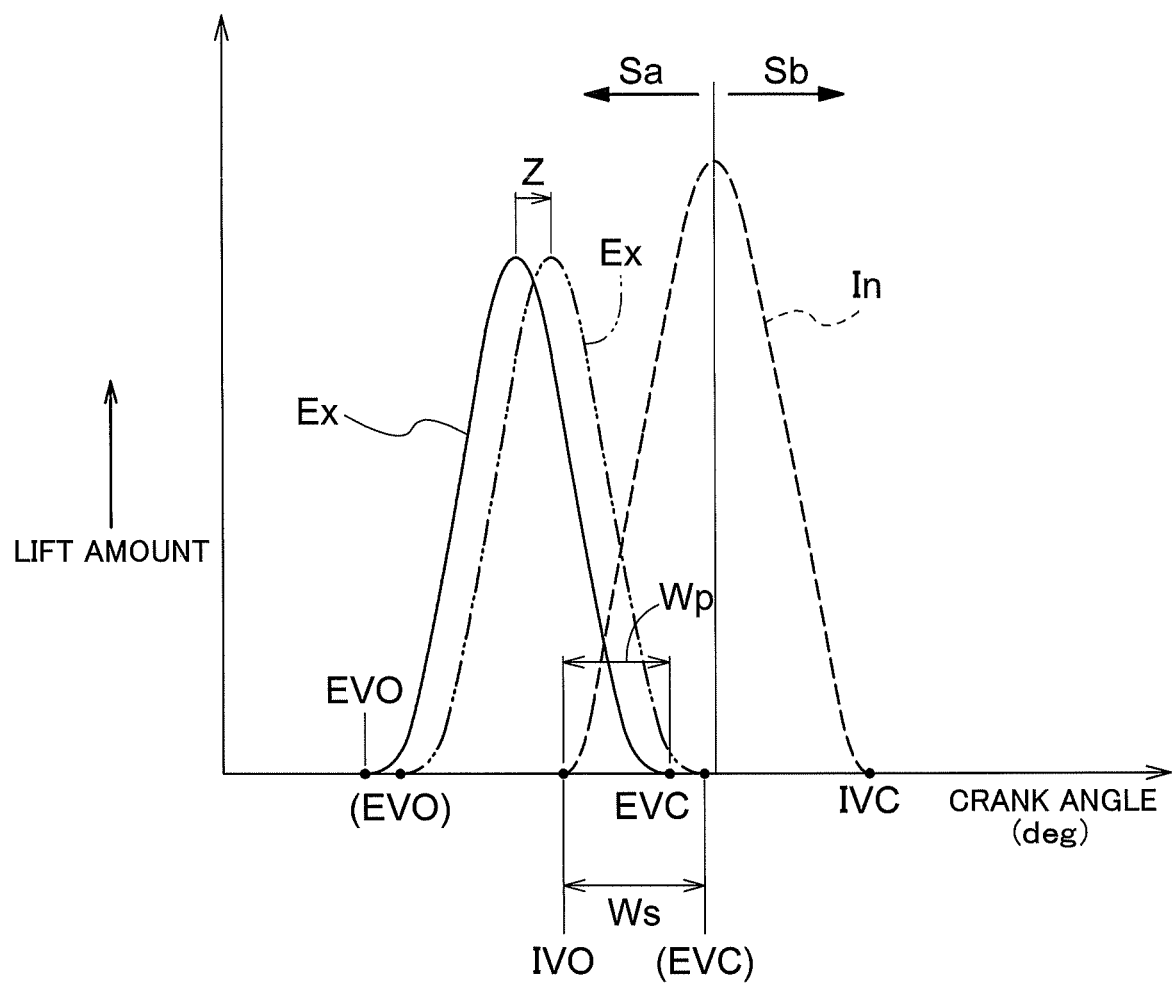
FIG. 9 is a chart showing valve timing and an overlap range according to another embodiment (a).

The mode of control is set so that, in the state where each valve timing has been set and the intake-side variable valve timing mechanism VTa is to be subjected to swing control (when swing control is performed in the advance direction Sa and the retard direction Sb in FIG. 9), an expanded overlap range Ws (an example of the overlap range W) is set in advance by displacing the exhaust valve timing Ex from the initial timing in the retard direction Sb in advance by a preset timing Z indicated by the alternate long and two short dashes line, to secure the initial overlap range Wp.

By performing such control, even when the intake valve timing In is displaced in the retard direction Sb through the swing control, it is possible to easily discharge and intake the gas from and to the combustion chamber in the overlap range W. Such control performed to displace the exhaust valve timing Ex from the initial timing in the retard direction Sb by the preset timing Z in advance is realized through the control performed by the correction controller 44. By setting this preset timing Z to be no less than the swing target phase Ty (Ty is in the retard direction Sb) when the intake-side variable valve timing mechanism VTa is to be subjected to swing control, it is possible to secure the initial overlap range Wp even when the intake-side variable valve timing mechanism VTa reaches the swing target phase Ty.

Also, in this modified embodiment (a), when only the target phase T of the exhaust-side variable valve timing mechanism VTb is controlled so as to swing, it is possible to realize such control by displacing the valve timing of the intake-side variable valve timing mechanism VTa toward the advance side by the preset timing Z in advance. It is possible to use a mechanism that is configured to control valve timing using a hydraulic means, as the variable valve timing mechanism VT that shifts the valve timing in advance in this way.

(b) As shown in the timing chart in FIG. 8, when the intake-side variable valve timing mechanism VTa is to be subjected to swing control, the valve timing of the exhaust-side variable valve timing mechanism VTb is set in synchronization with the swing control, and an increase and decrease of the intake air amount is controlled using the throttle 13.

In this figure, swing control is performed in three regions namely the first region U1, the second region U2, and the third region U3. In the swing control in the first region U1 and the second region U2, the displace amount of the intake-side variable valve timing mechanism VTa in the advance direction is increased to increase the intake air amount, and in the third region U3, the displace amount in the advance direction is reduced to reduce the intake air amount.

In order to reliably increase and reduce the intake air amount in this way, in the swing control in the first region U1 and the second region U2, the exhaust timing is displaced in the retard direction as indicated by the broken line regarding the exhaust-side variable valve timing mechanism VTb, and the intake air amount of the throttle 13 is increased as indicated by the broken line regarding the throttle 13.

In contrast, in the swing control in the third region U3, the exhaust timing is displaced in the advance direction as indicated by the broken line regarding the exhaust-side variable valve timing mechanism VTb, and the intake air amount of the throttle 13 is reduced as indicated by the broken line regarding the throttle 13.

In this modified embodiment (b), the exhaust-side variable valve timing mechanism VTb and the throttle 13 are controlled by the correction controller 44. Through such control, it is possible to suppress fluctuations in the intake air amount when the intake-side variable valve timing mechanism VTa is subjected to swing control. Also, in this modified embodiment (b), the exhaust-side variable valve timing mechanism VTb does not require high-speed operation, and therefore a configuration in which the exhaust timing is controlled using hydraulic pressure may be employed.

(c) As in the modified embodiment (b) described above, in the situation where the amount of displacement of the intake-side variable valve timing mechanism VTa is increased in the advance direction, and the exhaust-side variable valve timing mechanism VTb is displaced in the retard direction, control is performed to increase the amount of fuel to be supplied by the injector 9. By performing such control, the air-fuel ratio can be kept constant and proper combustion in the combustion chamber can be maintained.

The invention claimed is:

1. A valve timing control unit comprising:
    at least one valve timing control mechanism including:
        a driving rotary body configured to rotate in synchronization with a crankshaft of an internal combustion engine;
        a driven rotary body that is configured to rotate integrally with a camshaft that opens and closes a valve of a combustion chamber of the internal combustion engine, that is coaxial with a rotation axis of the driving rotary body, and that is disposed so that a relative rotational phase thereof relative to the driving rotary body is changeable with use of a bearing;
        an electric motor and a deceleration gear each configured to set the relative rotational phase; and
        a phase sensor unit configured to detect the relative rotational phase of the driving rotary body and the driven rotary body as an actual phase with respect to the rotation axis as a center; and
    a controller configured to control the electric motor to reduce a phase difference between the actual phase detected by the phase sensor unit and a target phase,
    wherein the controller includes a swing controller configured to swing the target phase in vicinity of the target phase in response to (i) the target phase being maintained and (ii) the actual phase having a fluctuation amount held in a holding region, in which the fluctuation amount is less than a preset value relative to the target phase.

2. The valve timing control unit according to claim 1, wherein the swing controller sets two swing target phases obtained by displacing a value of the target phase toward an advance side and a retard side by an equal amount, and swings the target phase back and forth between the swing target phases in preset cycles.

3. The valve timing control unit according to claim 1, wherein the phase sensor unit includes:
   a crank angle sensor configured to detect a rotation angle of the crankshaft;
   a camshaft angle sensor configured to detect a rotation angle of the camshaft; and
   a computation unit configured to obtain the actual phase from detection signals from the crank angle sensor and the camshaft angle sensor, and
   the valve timing control unit uses as the fluctuation amount an absolute value of a difference between a maximum value and a minimum value of the actual phase both obtained by the computation unit.

4. The valve timing control unit according to claim 2, wherein the phase sensor unit includes:
   a crank angle sensor configured to detect a rotation angle of the crankshaft;
   a camshaft angle sensor configured to detect a rotation angle of the camshaft; and
   a computation unit configured to obtain the actual phase from detection signals from the crank angle sensor and the camshaft angle sensor, and
   the valve timing control unit uses as the fluctuation amount an absolute value of a difference between a maximum value and a minimum value of the actual phase both obtained by the computation unit.

5. The valve timing control unit according to claim 1, wherein the swing controller sets a swing amount of the target phase to a value larger than the fluctuation amount by which the actual phase fluctuates in the holding region.

6. The valve timing control unit according to claim 1, further comprising:
   a rotation speed detector configured to detect a rotation speed of the crankshaft per unit time,
   wherein the swing controller starts swinging the target phase in response to the rotation speed detected by the rotation speed detector exceeding a preset value.

7. The valve timing control unit according to claim 2, further comprising:
   a rotation speed detector configured to detect a rotation speed of the crankshaft per unit time,
   wherein the swing controller starts swinging the target phase in response to the rotation speed detected by the rotation speed detector exceeding a preset value.

8. The valve timing control unit according to claim 3, further comprising:
   a rotation speed detector configured to detect a rotation speed of the crankshaft per unit time,
   wherein the swing controller starts swinging the target phase in response to the rotation speed detected by the rotation speed detector exceeding a preset value.

9. The valve timing control unit according to claim 4, further comprising:
   a rotation speed detector configured to detect a rotation speed of the crankshaft per unit time,
   wherein the swing controller starts swinging the target phase in response to the rotation speed detected by the rotation speed detector exceeding a preset value.

10. The valve timing control unit according to claim 1, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
    the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

11. The valve timing control unit according to claim 2, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
    the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

12. The valve timing control unit according to claim 3, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
    the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

13. The valve timing control unit according to claim 4, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

14. The valve timing control unit according to claim 5, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

15. The valve timing control unit according to claim 6, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

16. The valve timing control unit according to claim 7, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

17. The valve timing control unit according to claim 8, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve, and
the controller causes the swing controller to (i) swing the target phase of a first one of the intake-side valve timing control mechanism or the exhaust-side valve timing control mechanism in a direction and (ii) in conjunction with the swing of the target phase of the first one, swing the target phase of a second one of the intake-side valve timing control mechanism or the exhaust-side valve timing control mechanism in the direction.

18. The valve timing control unit according to claim 1, wherein the internal combustion engine includes as the at least one valve timing control mechanism:
    an intake-side valve timing control mechanism configured to control opening and closing timing of an intake valve; and
    an exhaust-side valve timing control mechanism configured to control opening and closing timing of an exhaust valve,
the internal combustion engine has an overlap range, which results from the intake-side valve timing control mechanism opening the intake valve before the exhaust-side valve timing control mechanism closes the exhaust valve, and
with a first one of the intake-side valve timing control mechanism or the exhaust-side valve timing control mechanism having opening and closing timing displaced in such a direction as to expand the overlap range, the swing controller swings the target phase of a second one of the intake-side valve timing control mechanism or the exhaust-side valve timing control mechanism.

19. The valve timing control unit according to claim 1, wherein the internal combustion engine includes as the at least one valve timing control mechanism an intake-side valve timing control mechanism configured to control opening and closing timing of an intake valve, and includes an electric throttle configured to control an amount of intake air to be supplied to the combustion chamber, and
when the swing controller swings the target phase of the intake-side valve timing control mechanism, the controller operates to increase the amount of intake air with use of the throttle in conjunction with an increase in an amount of displacement of the intake-side valve timing control mechanism in an advance direction.

20. The valve timing control unit according to claim 19, wherein the internal combustion engine includes a fuel injection device configured to supply fuel to the combustion chamber, and
in response to the amount of intake air being changed with use of the throttle, the controller controls an amount of fuel to be injected by the fuel injection device.

* * * * *